Oct. 17, 1933.                D. H. EBINGER                1,930,590
                            WATER MIXING VALVE
                            Filed Jan. 12, 1929          4 Sheets-Sheet 1

Inventor
D. H. Ebinger
By W. S. McDowell
Attorney

Inventor
D. H. Ebinger
W. A. McDowell
Attorney

Oct. 17, 1933.   D. H. EBINGER   1,930,590
WATER MIXING VALVE
Filed Jan. 12, 1929   4 Sheets-Sheet 3

Inventor
D. H. Ebinger
By W. S. McDowell
Attorney

Oct. 17, 1933.   D. H. EBINGER   1,930,590
WATER MIXING VALVE
Filed Jan. 12, 1929   4 Sheets-Sheet 4

Inventor
D. H. Ebinger

By H. S. McDowell
Attorney

Patented Oct. 17, 1933

1,930,590

UNITED STATES PATENT OFFICE 1,930,590

WATER MIXING VALVE

David H. Ebinger, Columbus, Ohio, assignor to The D. A. Ebinger Sanitary Mfg. Co., Columbus, Ohio, a corporation of Ohio Application January 12, 1929. Serial No. 331,975

1 Claim. (Cl. 137—111)

This invention relates to valve mechanism which finds its particular field of use in conjunction with pipe line systems through which water and liquids are circulated under pressure. Particularly the valve mechanism is employed in connection with water line systems connected or associated with municipal water mains and wherein fluctuating pressures are from time to time encountered.

It is one of the outstanding objects of the invention to provide in such valve mechanism improved and novel features of construction whereby hot and cold water, flowing through separate pipes, may be confined and proportionally mixed within the valve mechanism to the end of securing desired temperatures in the blended water stream which is finally discharged from the valve mechanism.

It is another object of the invention to provide in conjunction with the mixing valve mechanism an improved automatic regulator by which the volume of water, or other liquids, discharged from the valve mechanism may be maintained uniform and constant throughout the wide range of pressure differentials maintained on the water or fluids entering the valve mechanism.

With these and other objects in view which will appear as the description proceeds, the invention consists in the novel features of construction, combination of elements and arrangement of parts hereinafter to be fully described and pointed out in the appended claim.

Figure 1:
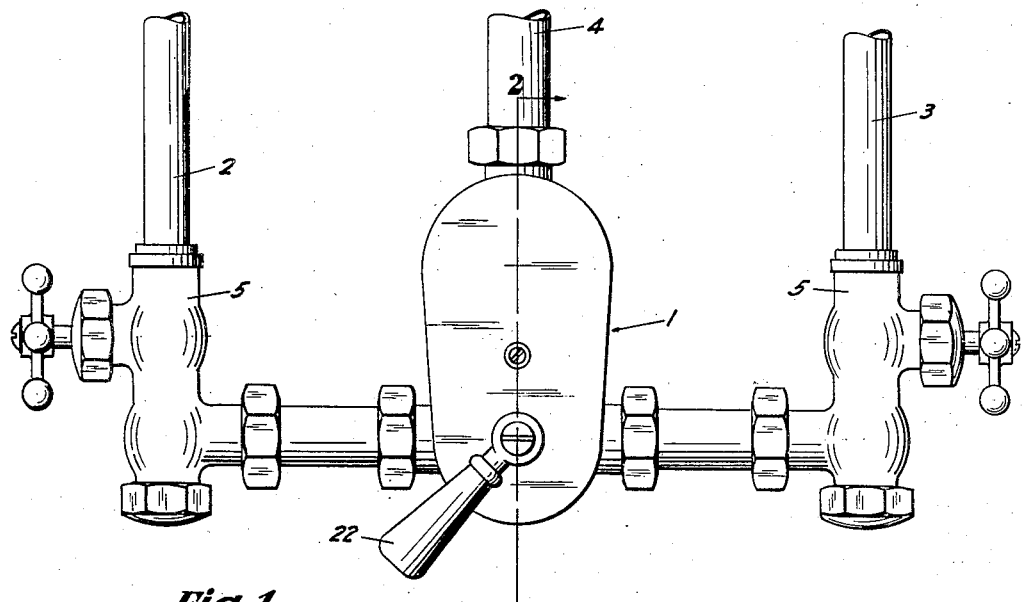
Figure 8:
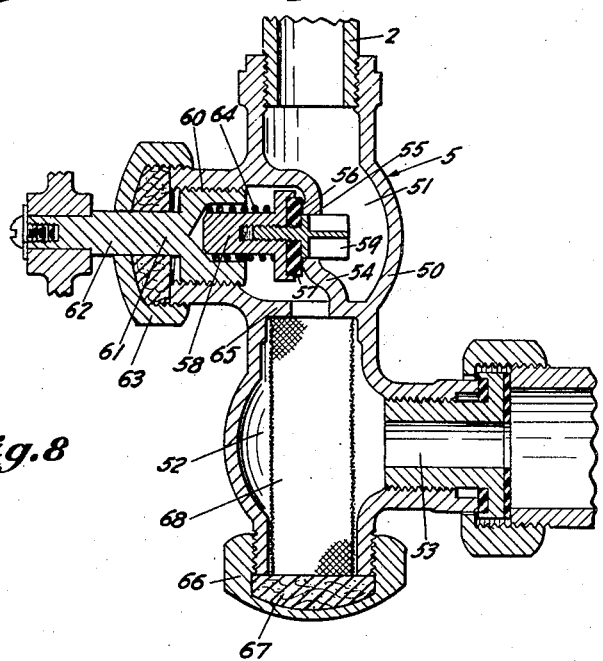
Figure 2:
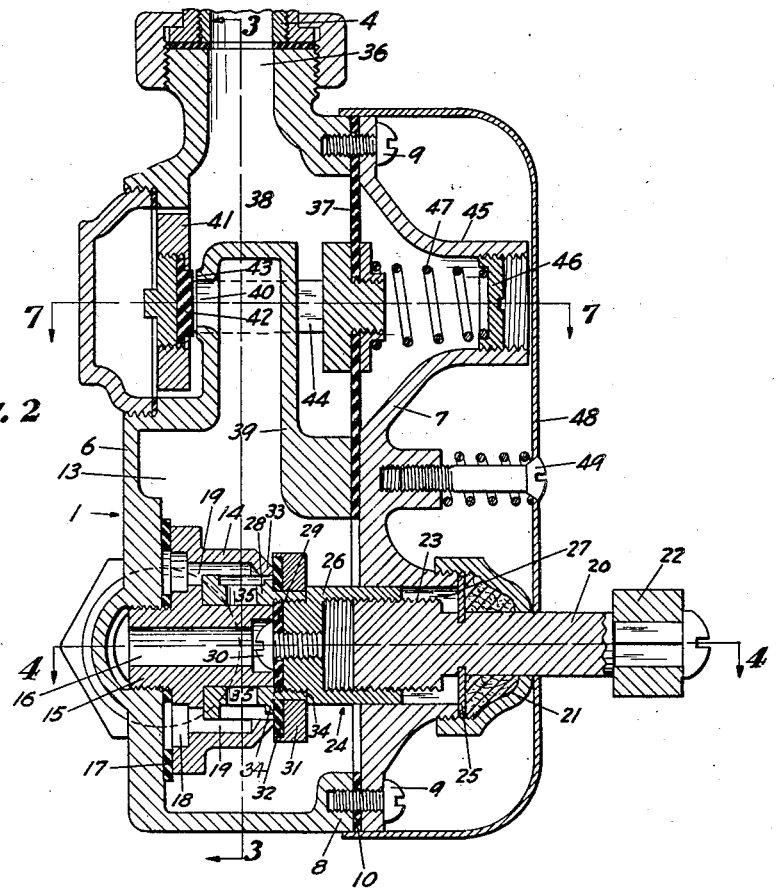
Figure 4:
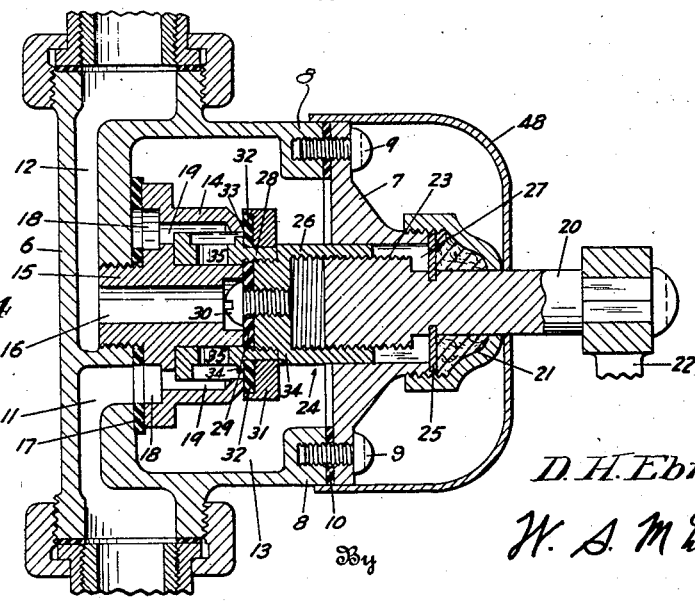
Figure 3:
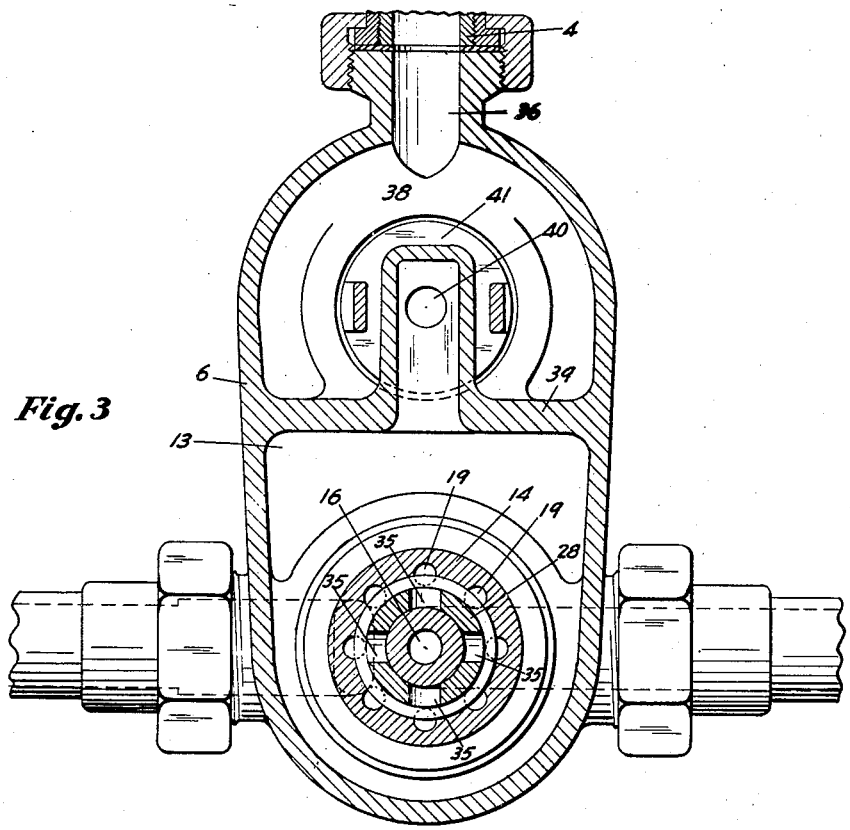
Figure 7:
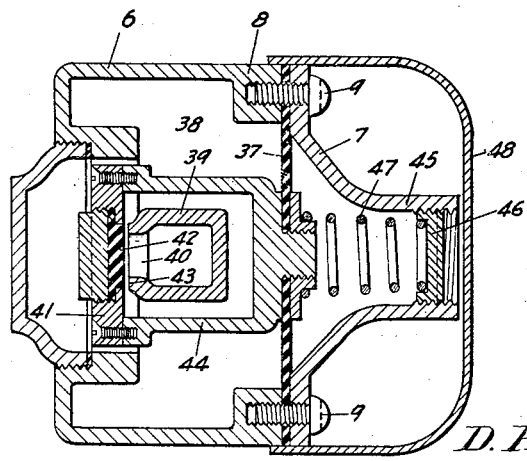
Figure 9:
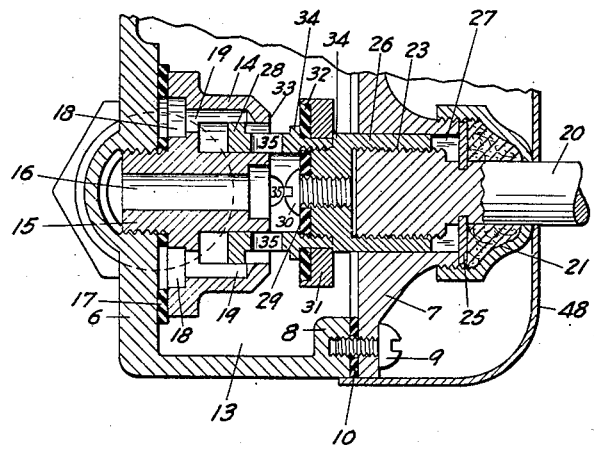
Figure 5:
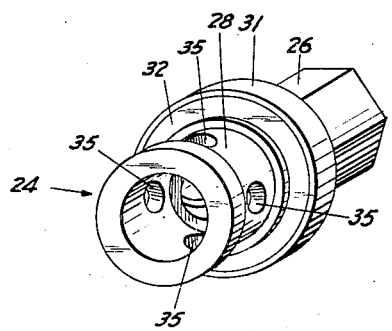
Figure 6:
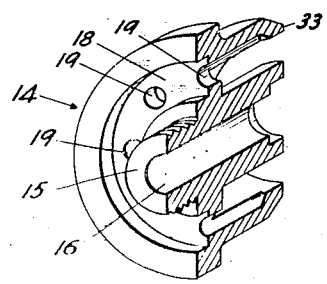

In the accompanying drawings:

Figure 1 is a view in front elevation of the valve mechanism comprising the present invention, Figure 2 is a vertical sectional view on the plane indicated by the line 2—2 of Figure 1, Figure 3 is a transverse vertical sectional view on the line 3—3 of Figure 2, Figure 4 is a horizontal sectional view on the line 4—4 of Figure 2, Figure 5 is a perspective view of the sliding valve assembly, Figure 6 is a similar view of the stationary cage member of the mixing valve construction, Figure 7 is a horizontal sectional view on the line 7—7 of Figure 2, Figure 8 is a vertical sectional view taken through the combined check and stop valve unit, Figure 9 is a vertical sectional view partially broken away showing the sliding valve assembly in the open position.

Referring more particularly to the drawings, the numeral 1 designates the improved mixing valve unit in its entirety. This unit is primarily employed in connection with water line systems through which water is forced under pressures which obtain frequently, for example, in municipal water mains. In this instance the unit 1 is connected with a cold water supply pipe 2 and also with a hot water supply pipe 3, the principal function of the unit 1 being to mix or blend the water obtained from the pipes 2 and 3 so as to produce a resulting stream of water having a desired temperature. It is also another function of the unit 1 to discharge therefrom a constant regulated stream of water irrespective of fluctuating pressures which may exist in the water supply to the unit through the pipes 2 and 3. Water leaves the unit 1 by way of the discharge line 4 which leads to any suitable point of discharge, for example, the outlet nozzles of a wash sink, the outlet nozzles of a shower bath or similar apparatus wherein it is desired to secure a stream of intermingled hot and cold water. Within the lines 2 and 3 there may be placed co-operative check-and-stop valve units, as indicated by the numeral 5, and which will be hereinafter more fully described.

The mixing valve unit per se consists of a casing formed to include a body section 6 and a cover section 7, the latter being secured to the marginal flange 8 of the body section by means of screws or their equivalent 9, there being a gasket 10 interposed between the meeting surfaces of the sections 6 and 7 to prevent undue escape of the fluid which passes through the casing.

The body section, as shown in Figure 4, is provided with a cored passage 11 which connects with the cold water pipe 2 and also with a second cored passage 12 which communicates with the hot water pipe 3. Arranged within the casing is a circular casting formed from brass, bronze or other similar material shaped to constitute a control medium for assisting in governing the inflow of hot and cold water into the inner compartment 13 of the casing, which casting I term for convenience in description the stationary cage member, and which is designated by the numeral 14. This cage member is provided axially with a threaded hub 15 adapted to be received within a threaded opening formed in the back wall of the body section 6, the hub being formed with an axial bore 16 which communicates with the end of the hot water passage 12. The face of the cage member 14 is formed to include concentric annular bearing surfaces which engage with washers or gaskets 17 to seal the joints between the adjoining portions of the cage member and the body section 6. Between the annular bearing surface the cage member is provided with a circular groove 18, which communicates openly with the end of the cold water passage 11, and the groove 18 is, in turn, in communication with a plurality of longitudinally extending openings 19 through which the cold water circulates after passing through the passage 11 and the groove 18.

For the purpose of regulating the inflow of water into compartment 13 by way of the bore 16 and the openings 19, I provide a manually operating means which in this instance comprises a shaft 20 journaled for rotation within a packed bearing gland 21, which is formed with the cover section 7, the outer portion of the shaft 20 being equipped with a handle 22 for the purpose of facilitating rotation of the shaft. The inner end of the shaft is enlarged and provided with screw threads 23, which are received within an internally screw threaded valve assembly 24. The shaft 20 is provided with an annular groove adapted for the reception of a split disk 25, which restrains the shaft 20 from moving longitudinally upon being rotated. Due to the screw threaded construction 23, however, the valve assembly is reciprocated, but not rotated, when the shaft 20 is rotated. To restrain the valve assembly from rotating axially, the cup element 26 thereof, in which the screw threaded end of the shaft 20 is received, is exteriorly of polygonal formation, and is received for sliding movement within a similarly formed socket 27 formed in the cover section 7.

The forward portion of the cup element 26 is reduced in diameter and exteriorly threaded so as to be received within an internally threaded bore provided in a sleeve element 28, and by which threaded connection the elements 26 and 28 are unitarily united. The reduced end of the element 26 is provided with a gasket 29 of a compressible material which is held in place by a screw 30 passing axially and longitudinally into the cup element 26. As shown in Figure 2 the gasket 29 normally engages with the outer end of the hub portion 15 of the stationary cage member 14, thereby closing the bore 16 and preventing hot water from issuing into the compartment 13 of the casing.

Likewise, in order to control the inlet of the cold water the valve assembly 24, in addition to the elements 26 and 28 includes an annulus 31 having one side thereof provided with a washer or gasket 32 which is adapted to engage with a seating surface 33 forming a part of the inner portion of the cage member 14 and disposed concentrically with the inner seating surface with which the gasket 29 engages. The annulus 31 is securely clamped in its applied position and constitutes a unitary part of the valve assembly by being confined between annular shoulders 34 formed by adjoining portions of the cup and sleeve elements 26 and 28.

It will be observed, by reason of this construction, that when the shaft 20 is initially rotated the movement imparted thereto results in bodily sliding movement on the part of the valve assembly. The initial movement imparted to the valve assembly withdraws the gasket 32 from the seating surface 33 of the cage member, which permits of the flow of cold water from the passage 11, through the groove 18 and thence through the openings 19 into the casing compartment 13. Continued rotation on the part of the shaft 20 results in further longitudinal movement of the valve assembly in an outward direction, and since the valve assembly is supported at one end by the shaft 20 and has its other end slidably supported by the axial hub 15 of the cage member, it will be seen that the sleeve element 28 of said valve assembly will be withdrawn sufficiently so that the radial ports 35 provided therein will be moved beyond the inner end of the hub 15 so that the bore 16 will then be in open communication with the compartment 13 by way of said ports. Due to the screw threaded method of control, the extent to which cold and hot water is introduced into the compartment 13 may be very carefully regulated and in addition the relative proportions of the cold and hot water streams are likewise susceptible to very minute regulation. As a result of this construction the blended stream of water discharged from the casing may possess a very carefully regulated desired temperature. Further, this temperature may be maintained indefinitely during the operation of the device, a feature which is secured by the carefully regulated orifice areas provided in the mixing valve construction. To close the valves the shaft 20 is rotated in the reverse direction to that previously described which seats the gaskets 29 and 32 thereby closing the cold water openings 19 and the hot water ports 35.

Devices of this character are usually connected with city water mains through which water is forced under varying pressure conditions, and in order to compensate for these fluctuating pressures and to maintain a constant pressure at the discharge nozzle or nozzles 36 associated with the mixing valve unit, there is arranged within the casing of said unit an automatic regulator mechanism. This regulator mechanism comprises a flexible diaphragm 37 which is arranged between the body and cover sections 6 and 7 of the casing and situated in a discharge chamber 38, which is spaced from the chamber or compartment 13 by a dividing wall 39, in which is provided a restricted port 40, constituting the avenue of liquid flow between the compartment or chambers 13 and 38.

Water flowing through the port 40 is regulated by a movable valve member 41 which has the axial portion of one of the surfaces thereof provided with a washer 42 arranged to be moved into seating engagement, at intervals, with a flanged seating surface 43 surrounding the port 40. The valve member 41, which is of disk-like formation, is directly connected with the diaphragm 37 by means of a frame 44 so that when the diaphragm is actuated or flexed beyond a normal position the valve member will be moved in unison therewith to regulate the effective opening of the port 40. The cover section 7, in registration with the diaphragm 37, is provided with an outwardly directed neck 45, having its outer end interiorly threaded for the reception of an adjustable nut 46. Confined between this nut at one side of the diaphragm is a coil spring 47, which normally tends to flex the diaphragm inwardly and to move the valve member 41 to a position permitting of the full opening of the port 40.

Thus after the opening of the mixing valve, mixed hot and cold water flowing from the chamber 13 into the discharge chamber 38 by way of the port 40 will pass from the discharge chamber 38 into the outlet line 4 and to the nozzles or other apparatus associated with the unit. The discharge nozzles in conjunction with which the unit 1 is employed, are provided with restricted outlet openings so that a certain amount of pressure is built up within the line 4 and the chamber 38, which pressure is augmented by that which is employed in the principal water mains used in supplying the mixing unit with hot and cold water. It will be seen that if the pressure in the chamber 38 exceeds a pre-determined mean pressure the diaphragm 37 will be flexed outwardly against the resistance exercised thereon by the spring 47, with the result that the port 40 is either closed or partially closed to restrict further inflow of water into the discharge chamber until the abnormal pressures in said chamber have been relieved. Conversely, if the pressures in the chamber 38 are below a pre-determined normal, the spring 47 operates to flex the diaphragm inwardly, thereby opening the port 40 to a greater extent than usual for the purpose of supplying additional volumes of water and thereby maintain the pressures in the discharge line 4 substantially constant.

The cover section 7 may be closed by means of a false top 48, held in place by fasteners 49, which are threaded into openings formed in the section 7.

The check-and-stop valve units, which are arranged in the water lines 2 and 3, ahead of the valve unit 1, each consist of a metallic body 50 provided with a water inlet chamber 51, an intermediate stainer chamber 52, and an outlet chamber 53. The chambers 51 and 52 are separated by a partition wall 54 which is provided with a port 55. This port includes an annular seating surface 56 adapted to receive compressible washers 57 carried by a combination check-and-stop valve 58, the said valve being provided with a forwardly projecting spider 59, which constitutes a guide to permit of the reciprocation of said valve on opening and closing the port 55.

To operatively mount the valve 58, the body 50 is provided with an internal threaded bore 60 in which is threadedly received an actuating stem 61, a portion of which protrudes exteriorly of the body as indicated at 62 and projects through a stuffing box or gland 63. Interposed between the stem 61 and the valve 58 is a coil spring 64, the tendency of which is to force the valve 58 into seating engagement with the surface 56. The spring, however, is not strong enough to prevent the valve from opening freely in response to normal water pressures exerted thereon by the water which collects in the inlet chamber 51. However, upon reverse water pressure the valve 58 automatically closes to prevent such reverse water flow through the port 55. When it is desired to close the valve 58 for a desired period of time, the stem 61 is rotated so as to be brought into direct contact with the outer portion of the valve 58, thereby forcing said valve to a closed position and retaining the same in such position independently of the spring 64 or any water pressures which may be exerted thereon.

Separating the bore 60 from the strainer chamber 52 is an apertured wall 65 and arranged to close the bottom of the strainer chamber 52 is a threaded cap 66, which engages with a washer 67 to maintain the body fluid-tight. Seated upon the washer 67 is a tubular strainer 68 of wire mesh material which serves to trap foreign particles or matter entrained in the water stream passing through the unit 5. The strainer may be removed and cleaned by the mere removal of the cap 66. Water flows from the strainer 68 to the outlet chamber 53 and thence to the mixing valve unit 1.

In view of the foregoing description and taken in conjunction with the accompanying drawings it will be seen that the present invention provides a valve mechanism designed first to provide for the effective intermingling of hot and cold streams of water or other liquid, by which such fluids are permitted to pass in intermingled form and at desired temperature to a common outlet and, second, the mechanism provides for an arrangement whereby the pressure of the water flowing to such outlet is maintained substantially constant under fluctuating conditions of pressure of the fluids supplied to the mixing valve. The construction for accomplishing these ends is exceedingly simple yet positive and efficient in operation. Due to its constructional simplicity there is but small likelihood of mechanical disorder or breakage of parts. The various parts have been designed with a view of adapting the unit readily to standard plumbing conditions so that its installation in connection with the water supply systems of various kinds of buildings may be conveniently carried out.

What is claimed is:

In a mixing valve, a casing formed to include a body section and a separable cover section, said body section being provided with spaced hot and cold water passages, a cage member secured to and located within said body member, said cage member being provided with an axially disposed hub provided with a longitudinal opening, said latter opening being in communication at one end thereof with one of said passages, said cage member being further formed with a plurality of longitudinally extending openings communicating with the other of said passages, a manually operated valve slidably mounted upon the hub portion of said cage member, said valve member being provided with a plurality of radial ports, means for admitting of manual operation on the part of said valve member to space said valve member from the plurality of longitudinal openings in the cage member to permit of the issuance of water from said last named openings into a mixing chamber formed by said casing and upon continued operation of said valve member to bring the ports thereof into positions in the confines of said cage member to permit of the flow of water through said axial opening and into said mixing chamber, a discharge conduit leading from said mixing chamber and means arranged within said discharge conduit and responsive to water pressures developed therein to automatically maintain a constant pressure at the discharge end of said conduit.

DAVID H. EBINGER.